United States Patent [19]

Kircher et al.

[11] Patent Number: 5,421,643
[45] Date of Patent: Jun. 6, 1995

[54] BRAKE SYSTEM FOR AUTOMOTIVE VEHICLES WITH ELECTRIC DRIVE

[75] Inventors: Dieter Kircher, Bad Vilbel-Dortelweil; Peter E. Rieth, Eltville; Bill Karlheinz, Dreieich; Juergen Balz, Wiesbaden; Lothar Kunze, Hofheim-Langenhain; Georg Halasy-Wimmer, Eschborn, all of Germany

[73] Assignee: ITT Automotive Europe GmbH, Germany

[21] Appl. No.: 157,742

[22] Filed: Nov. 24, 1993

[30] Foreign Application Priority Data

Nov. 24, 1992 [DE] Germany ............... 42 39 386.8

[51] Int. Cl.⁶ .................... B60T 11/20; B60T 11/28; B60T 13/66; B60T 13/74
[52] U.S. Cl. .......................... 303/3; 180/165; 188/156; 303/20; 303/DIG. 3; 303/113.4
[58] Field of Search ............ 180/165, 65.1, 65.3, 180/197; 303/3, 6.01, 9, 119.2, 9.61, 14, 15, 16, 17, 119.1, 20, 100, 113.4, DIG. 3, DIG. 4; 188/156, 158, 159, 106 P; 60/545, 565; 364/426.01, 424.01

[56] References Cited

U.S. PATENT DOCUMENTS

| 3,171,505 | 3/1965 | Imelmann | 188/156 X |
|---|---|---|---|
| 3,621,929 | 11/1971 | Oberthur et al. | 188/156 X |
| 4,005,759 | 2/1977 | Farr | 303/3 X |
| 4,181,366 | 1/1980 | Dobner | 303/3 |
| 4,270,806 | 6/1981 | Venkataperumal et al. | 188/159 X |
| 4,425,005 | 1/1984 | Warwick | 188/159 X |
| 4,591,016 | 5/1986 | Matthews | 188/156 X |
| 4,671,577 | 6/1987 | Woods | 188/156 X |
| 4,962,969 | 10/1990 | Davis | 188/156 X |
| 5,253,929 | 10/1993 | Ohori | 188/156 X |
| 5,294,191 | 3/1994 | Giorgetti et al. | 188/156 X |
| 5,312,167 | 5/1994 | Giorgetti et al. | 188/156 X |
| 5,318,355 | 6/1994 | Asanuma et al. | 303/3 |

OTHER PUBLICATIONS

A. Giorgetti et al., "Design of a Lightweight Braking System for Electric Cars," *SAE Paper* 920649, pp. 115–125, (Jan. 1992).

*Primary Examiner*—Douglas C. Butler
*Attorney, Agent, or Firm*—Ratner & Prestia

[57] ABSTRACT

A brake system for automotive vehicles with electric drive is operable by an actuating pedal and uses hydraulic friction brakes to augment the braking effect generated by the electric drive motors. The coaction of the drive motors with the hydraulic friction brakes is controlled by an electronic controller. In order to largely conform the pedal characteristics of the mentioned brake system to that of a standard passenger car, an actuating pedal (5) is in force-transmitting and travel-transmitting connection with a spring (8) exhibiting a predetermined characteristic curve, and the master brake cylinder (11), uncoupled from the actuating pedal (5), is operable by an electromagnet (9) which is responsive to the controller (70). If the master brake cylinder accommodates two pressure chambers, a single valve is arranged in or on the master cylinder housing, and acts as both a bypass valve and a differential-pressure valve.

14 Claims, 5 Drawing Sheets

BRAKE SYSTEM FOR AUTOMOTIVE VEHICLES WITH ELECTRIC DRIVE

BACKGROUND OF THE INVENTION

The present invention relates to a brake system for automotive vehicles with electric drive. In particular, the present invention relates to a brake system which is operable by an actuating pedal and includes at least one electric drive motor as well as hydraulic friction brakes which are connected to a master brake cylinder. Such brake systems also include a device for determining the pressure prevailing in the master brake cylinder, an electronic controller to which the output signal of a sensor determining the actuating condition of the actuating pedal is fed, and a control device controlling the electric drive motor(s).

A brake system of this kind is described in the article "Design of a Lightweight Braking System for Electric Cars" (SAE-paper 920649 of January 1992). In this system, the hydraulic friction brakes are connected to the corresponding pressure chambers of the master brake cylinder via the intermediary of valve assemblies which are each formed by an electromagnetically operable bypass valve as well as by a differential-pressure control valve which is operable by the pressure prevailing in the hydraulic pressure chamber of the master cylinder. The two valves, preferably, are connected in parallel. Electromagnets, which actuate the bypass valves, are driven by the control devices which control the electric drive motors.

The pedal characteristics of this known system are considered disadvantageous. These pedal characteristics conform only very imperfectly to the pedal characteristics of a standard passenger car and exhibit a broad hysteresis and two portions of different gradients resulting in a discontinuous pedal feeling. Further, the known brake system cannot take into account the varying retarding power of the electric drive motors. Also, the separate mounting of the master brake cylinder and the valve assemblies requires considerable space.

SUMMARY OF THE INVENTION

The present invention is directed to a brake system of the type initially referred to whose pedal characteristics correspond largely to that of a standard passenger car. At the same time, the pedal characteristics exhibit a narrow hysteresis and a continuous variation so that a pleasant pedal feeling is imparted to the driver. Finally, the brake system of the present invention is able at any time to react to the varying retarding power of the electric drive motors. In addition, it permits a space-saving assembly by using individual parts which lend themselves to low-cost manufacture.

According to a first embodiment of the present invention, the actuating pedal is in force-transmitting and travel-transmitting connection with a spring having a predetermined characteristic curve, and the master brake cylinder, uncoupled from the actuating pedal until the actuating pedal has traveled a threshold distance, is operable by an electromagnet responsive to the controller.

A design of the subject matter of this invention permits manufacture at especially low costs. According to this design, an actuating rod is articulated at the actuating pedal and the actuating rod carries a plate on which the spring is supported.

According to a preferred embodiment of the present invention, the spring is arranged such that it can be uncoupled from the actuating pedal in terms of effect. In this embodiment, the actuating rod carries a plate that cooperates with a second electromagnet which is drivable on actuation and on which the spring takes support. Owing to these provisions, an advantageous reduction of the actuating force in the event of error detection or power failure is achieved. The second electromagnet can be driven either by the controller or by a brake light switch responsive to the actuating pedal.

In order to achieve a sufficient braking effect upon power failure, it is provided in another embodiment of the present invention that the plate is movable into engagement with a piston rod, after the actuating pedal has travelled a threshold distance, to actuate the master cylinder piston.

In a particularly compact design variant of the actuating unit according to the present invention, the electromagnet is arranged coaxially to the master brake cylinder such that its armature embraces the piston rod radially and is axially abutting on a collar of larger diameter provided on the piston rod.

A reliable abutment of the plate on the second electromagnet is achieved according to another inventive feature by a second spring interposed between the armature of the first electromagnet (solenoid) and the plate.

A particularly effective coupling or locking between the spring and the actuating pedal is achieved in another design of the present invention. In this design, the electromagnet is arranged so as to be axially slidable within limits and cooperates with a hydraulic piston which confines a hydraulic chamber, the connection of which with the pressure fluid supply reservoir can be shut off on actuation. Also, in this design, the spring is supported on the electromagnet. Preferably, the piston is designed as an annular piston and bounds the chamber designed as an annular chamber in a flange adapted to be fitted preferably to a body wall of the automotive vehicle. A valve, preferably open in its deenergized state, shuts off the annular chamber from the pressure fluid supply reservoir and responds to the controller or to a brake light switch cooperating with the actuating pedal. A brake system of this design can divide the driver's demand for deceleration among the electric drive motors operating in the braking mode and the hydraulic friction brakes without adversely affecting the reaction force on the pedal.

In a weight-optimized actuating unit of the brake system according to the present invention, the master cylinder housing is made of plastics and is designed integrally with the pressure fluid supply reservoir.

Minimizing the number of possible leakages is achieved in another preferred embodiment of the present invention. In this embodiment, the connection between the annular chamber and the pressure fluid supply reservoir is formed by two bores provided in the flange as well as by a tubular pressure fluid duct which is shaped at the pressure fluid supply reservoir and connects to one of the bores.

According to another design which has short overall dimensions particularly in the front part of the automotive vehicle, in which usually the batteries are accommodated, the master brake cylinder is coupled to the flange by the intermediary of the automobile body wall.

It is expedient that the flange and the electromagnet form an assembly unit which carries the controller.

According to a design variant of the present invention which can be manufactured at low costs, the master cylinder piston is designed as a plunger piston and is slidably guided in a sliding guide arranged in the master cylinder housing.

These provisions permit the use of plastic pistons which have a shape such that expensive compensating bores (so-called breathering holes) can be avoided.

A further cost reduction results in another design of the subject matter of this invention in which the sliding guide serves as an axial stop for the master cylinder piston and as an abutment surface for a resetting spring biasing the master cylinder piston. In this arrangement, the sliding guide is designed as a sleeve provided with an external thread which is screwed into the master cylinder housing. Manufacturing advantages are achieved by these provisions.

A mechanical intervention upon rupture of the spring cooperating with the actuating pedal is ensured in another preferred embodiment of this invention by the actuating rod being movable into engagement with a piston rod that actuates the master cylinder piston, after the actuating rod has traveled a threshold distance.

Finally, in order to augment the operational reliability of the brake system according to this invention, a device is provided for sensing the switch condition of the valve between the pressure fluid supply reservoir and the annular chamber. Preferably, this valve is designed as a solenoid valve, and the device senses variations of the inductivity of its coil which are caused by variations of the switch conditions of the valve.

It is expedient in dual-circuit brake systems that the master brake cylinder is designed as a tandem master cylinder.

In further preferred embodiments of the present invention, the device for sensing the pressure prevailing in the master brake cylinder is a pressure sensor or a magnetic field sensor for sensing the magnetic field of the electromagnet actuating the master brake cylinder. The use of a magnetic field sensor is especially favorable since no intervention in the hydraulics is necessary.

According to another embodiment of the present invention for a master brake cylinder accommodating a first pressure chamber and a second pressure chamber, a pressure sensor is connected to the first pressure chamber which serves to sense the actuating force or to actuate the control device controlling the electric drive motor(s). A valve assembly composed of a bypass valve and a differential-pressure valve is connected to the second pressure chamber and has its outlet connect to the hydraulic friction brakes. This valve assembly is arranged in the master cylinder housing and is composed of one single valve. This arrangement serves to obtain a particular compact design of the actuating unit which permits to economize connecting lines and, simultaneously, to reduce the number of possible leakages.

Preferably, the single valve which acts as both a bypass valve and a differential pressure control valve is formed by a sealing seat closable by a closing member (e.g. a ball) and provided in a piston which is slidable within limits and to which the hydraulic pressure prevailing in the second pressure chamber is applicable. The closing member cooperates with an electromagnetically slidable tappet whose position determines the position of the piston and hence the zero point of the operating range of the pressure control phase.

A simple machining of the master cylinder housing is achieved in a preferred embodiment of the invention in that the valve assembly is symmetrical in the rotational direction and is arranged at the end of the master cylinder housing such that its axis of symmetry is identical with the master cylinder's longitudinal axis.

In order to shorten the overall axial length of the actuating unit, the valve assembly is symmetrical in the rotational direction and is arranged at the end of the master cylinder housing such that its axis of symmetry together with the master cylinder's longitudinal axis encloses an angle from 0° to 90°.

In another embodiment of the present invention, a fail-safe position of the valve assembly in which in the event of power failure a connection is safeguarded. This connection is between the second pressure chamber of the master brake cylinder and the hydraulic friction brakes and is kept open by the tappet being preloaded by a compression spring in the opening direction of the valve assembly. Thus, a pressure build-up in the hydraulic brakes is still possible in the event of a power failure.

It is also preferred that the tappet is coupled to the armature of an electromagnet by a force-transmitting connection and is guided in a blind-end bore formed in the housing of the electromagnet. The length of the bore is sized slightly larger than the actuating stroke of the tappet. It is ensured thereby that an emergency stop is available for the tappet if the armature is improperly attached to the tappet.

According to another preferred embodiment of the present invention, the electromagnet is designed as a proportional magnet. The possibility of varying the zero point of the operating range of the pressure control phase individually results therefrom.

The master cylinder piston confining the second pressure chamber should be movable into force-transmitting connection with the piston. With this arrangement, an exploitable pedal travel proportional to pedal force on the occurrence of hydraulic failure of the second pressure chamber is propagated to the hydraulic friction brakes, instead of being taken up by the pressurization of the second pressure chamber. The transmission of force is effected preferably by a cylindrical sleeve axially abutting on the second master cylinder piston.

A travel simulator function is realized upon failure of the second pressure chamber by one end of the piston abutting on a cup spring assembly supported on the housing of the electromagnet and by the other end of the piston formed on a stop with the master cylinder housing. The housing of the electromagnet is provided as an axial stop for the piston.

Finally, an enhanced operating reliability of the brake system according to the present invention is achieved by the hydraulic pressure prevailing in the first pressure chamber serving exclusively to actuate the pressure sensor so that the braking effect of the electric drive motors is safeguarded without the influence of the hydraulic friction brakes.

BRIEF DESCRIPTION OF THE DRAWINGS

Further details of the present invention can be taken from the following description of two embodiments with reference to the accompanying drawings in which like reference numerals designate corresponding individual parts. In the drawings.

DETAILED DESCRIPTION OF THE INVENTION

Figure 1:
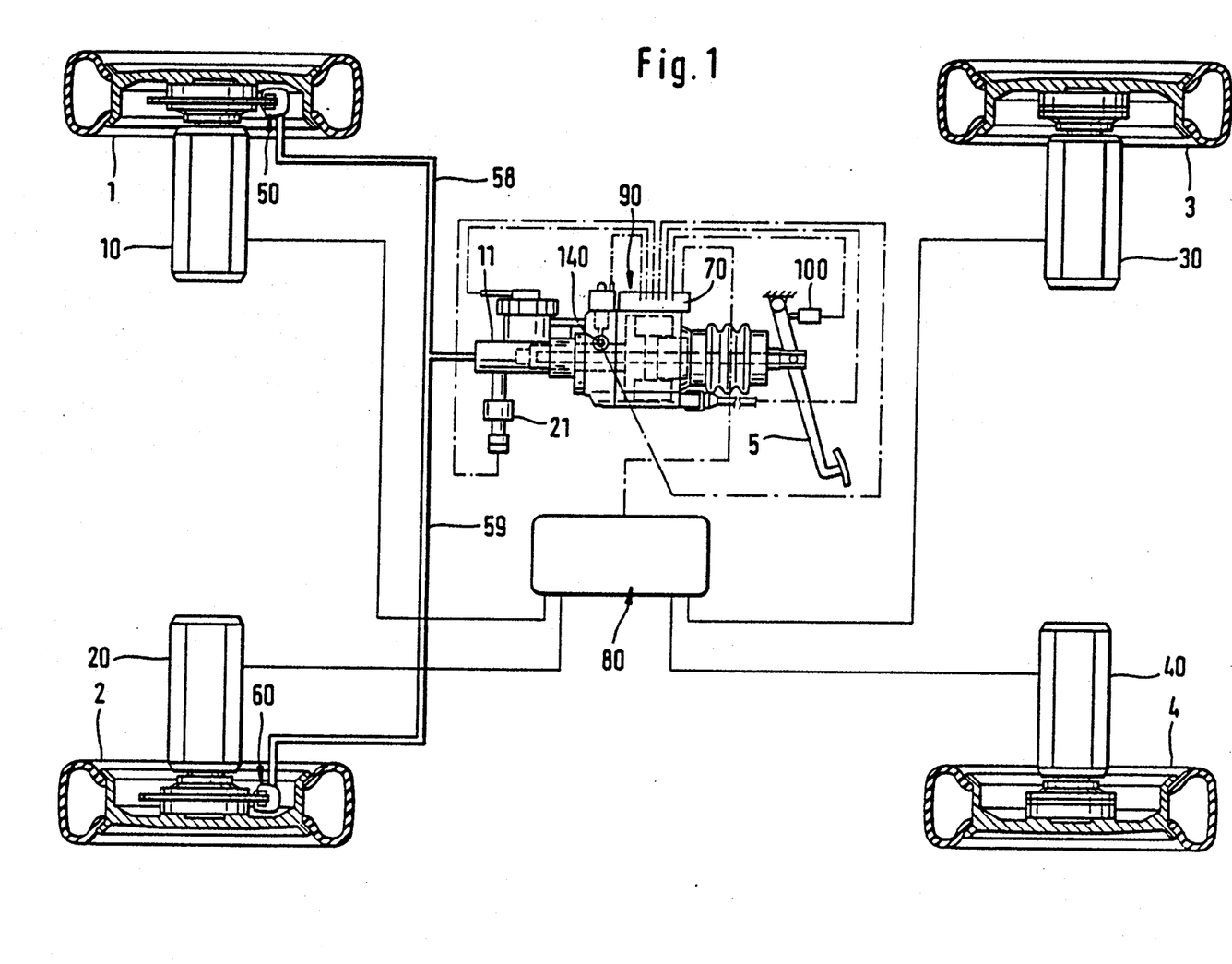
FIG. 1 is a simplified schematic view of a first embodiment of the brake system according to the present invention.
Figure 2:
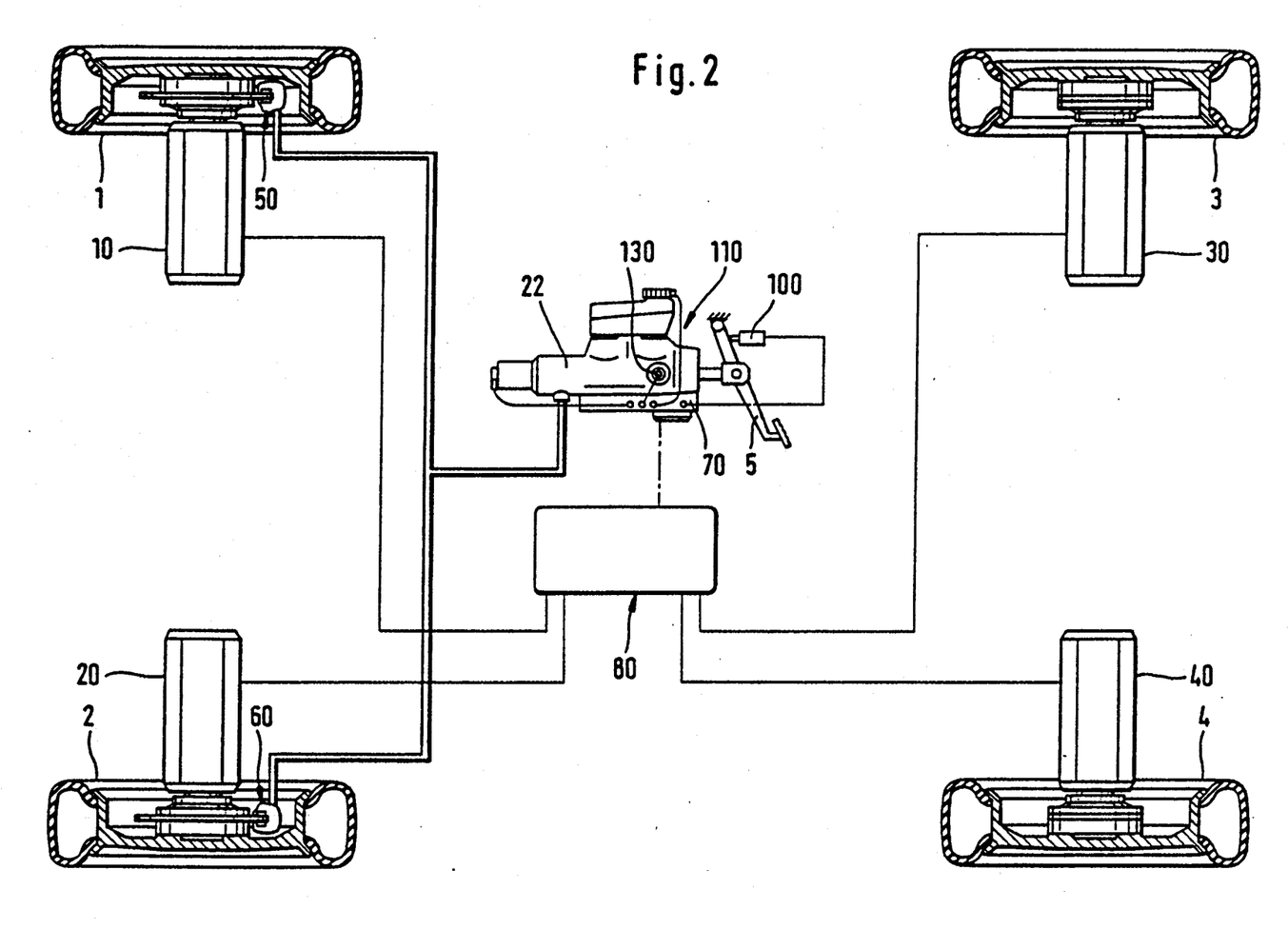
FIG. 2 is a simplified schematic view of a second embodiment of the brake system according to the present invention.

As shown in FIGS. 1 and 2, the brake system according to the present invention is composed of an actuating unit 90, 110 operable by an actuating pedal 5 and a master brake cylinder 11, 22 to which, via hydraulic lines 58, 59, hydraulic friction brakes 50, 60 are connected. Hydraulic friction brakes 50, 60 are allocated to the wheels 1, 2 of a vehicle axle, for instance the front axle. The wheels 1, 2 equipped with the hydraulic friction brakes 50, 60 are driven by electric drive motors 10, 20, while the wheels 3, 4 of the other vehicle axle are driven by electric drive motors 30, 40. The electric drive motors 10, 20, 30, 40 can also be used for braking the vehicle and are connected to a control device 80 for this purpose. Control device 80 is fed with control signals of an electronic controller 70 which, in response to the driver's desire to decelerate, controls the coaction of the hydraulic friction brakes 50, 60 with the electric drive motors 10, 20, 30, 40 to brake the vehicle. This braking action is dependent on output signals (e.g. actuating pedal position signals) of a brake light switch 100 operable by the actuating pedal 5 and on output signals of a pressure sensor 140 (FIG. 1) or 130 (FIG. 2) which senses a hydraulic pressure corresponding to the driver's desire or, respectively, a pressure prevailing in the master brake cylinder.

Figure 3:
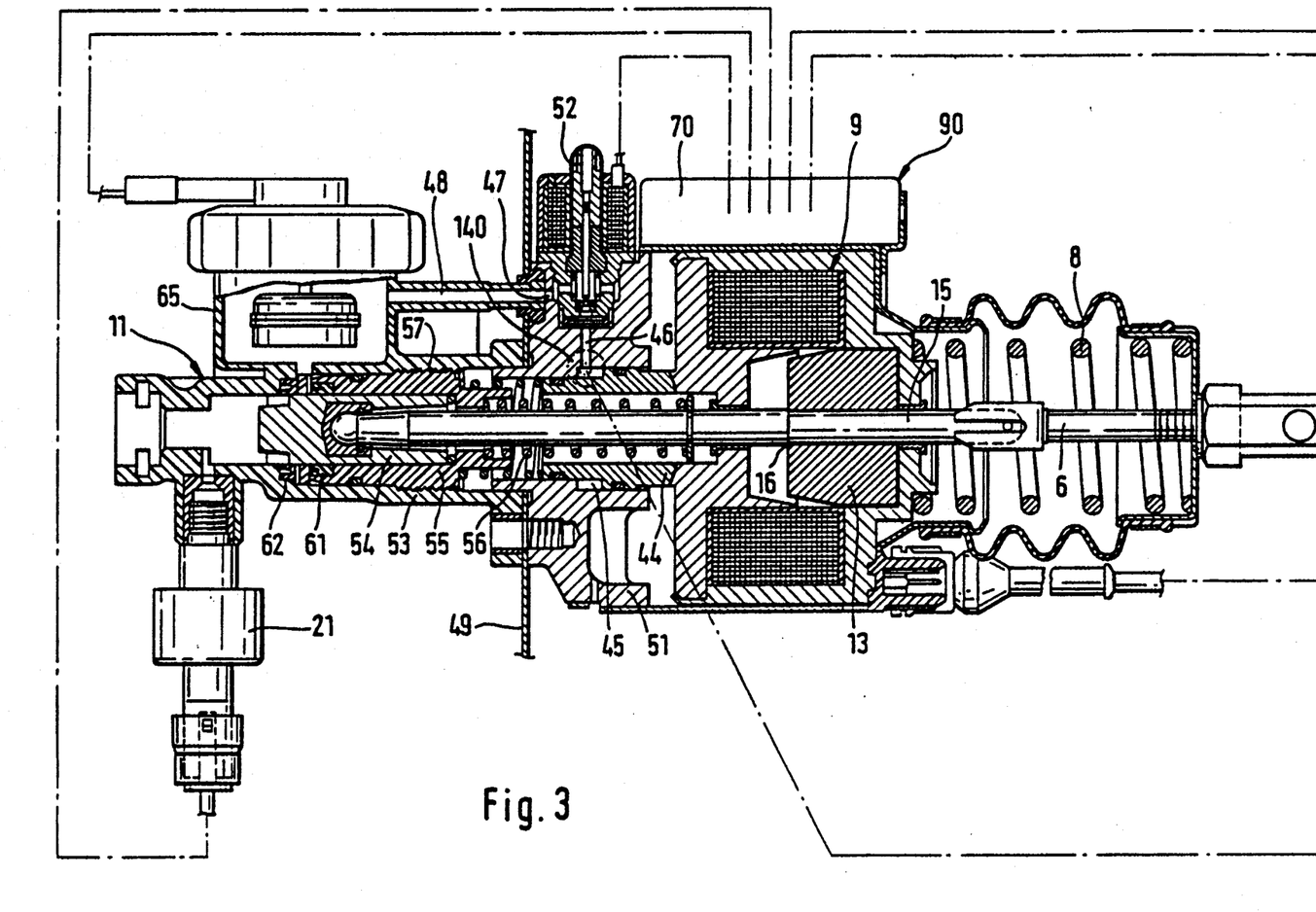
FIG. 3 is a partial cross-sectional view on an enlarged scale of the actuating unit of the brake system shown in FIG. 1.

The actuating unit 90 used on the inventive brake system according to FIG. 1 is illustrated on an enlarged scale in FIG. 3 which shows master cylinder 11 having master cylinder piston 54 which is operable by a piston rod 15. The master cylinder piston 54 configured as a plunger piston is slidably guided preferably in a sliding guide 55 formed by a plastic sleeve which, provided with an external thread 57, is screwed into the master cylinder housing 53, which also is made of plastics. Each sealing sleeve 61 and 62 arranged in the sliding guide 55 or, respectively, in the master cylinder housing 53, effect the sealing of the master cylinder piston 54 in relation to the sliding guide 55 as well as in relation to a pressure fluid supply reservoir 65 shaped integrally with the master cylinder housing 53. A resetting spring 56, preloading the master cylinder piston 54 in the direction opposite to the actuating direction, takes support on the sliding guide 55 which forms an axial stop for the master cylinder piston 54.

When the actuating unit is attached in the vehicle or to an automobile body wall 49, the master cylinder housing 53 is screwed to a flange 51, and the automobile body wall 49 is clamped in between master cylinder 11 and flange 51. Flange 51 forms an assembly unit together with an electromagnet 9 which is arranged so as to be slidable or movable within limits relative to the master brake cylinder 11, preferably in a coaxial direction, and serves to guide an annular piston 44 which is in force-transmitting connection with the electromagnet 9. The annular piston 44 confines in the flange 51 a hydraulic chamber 45, which is connected to a pressure fluid supply reservoir 65. This connection is closable by means of a valve 52, e.g. a solenoid valve, open in its de-energized condition. The previously mentioned connection consists of two bores 46, 47 provided in the flange 51, preferably disposed perpendicularly to each other, with the point of intersection being the valve seat of the valve 52 and of a tubular pressure fluid duct 48 which is shaped as one-piece on the pressure fluid supply reservoir 65 and which connects to the horizontally extending bore 47.

In order to permit an actuation of the master brake cylinder 11 by the electromagnet 9 when the actuating pedal 5 is uncoupled from the piston rod 15, the piston rod 15 is provided with an annular collar 16 of larger diameter on which the armature 13 of the electromagnet 9 is in axial abutment. Armature 13 is movable in response to energization of electromagnet 9.

In the event that the braking effect requirement can be met alone by the electric drive motors 10, 20, 30, 40 (FIGS. 1, 2) operating in the braking mode, a corresponding pedal feeling must be imparted to the driver of the vehicle. For this purpose, a spring 8 interposed in terms of effect between the actuating pedal 5 and the electromagnet 9 is provided. Spring 8 has a predetermined characteristic curve which simulates the reaction force caused during hydraulic braking operation.

In order to transmit the actuating force introduced at the actuating pedal 5 to the master cylinder piston 54 in the event of rupture of the simulator spring 8, piston rod 15 can be brought into engagement with an actuating rod 6 which is coupled to and movable in response to the actuating pedal 5, after pedal 5 has traveled a threshold distance. Further, it is expedient that the controller 70 is carried by the assembly unit consisting of flange 51 and electromagnet 9 so that it is placed in the passenger compartment in the illustrated arrangement where it is protected against corrosion influences, such as splash-water and battery chamber atmosphere.

Once a braking operation is started by depression of the actuating pedal 5 and when only 30% of the total braking effect is required which can be generated alone by the electric drive motors 10 to 40, the actuating condition of the actuating pedal 5 is recognized both by the brake light switch 100 and by the pressure sensor 140 sensing the hydraulic pressure in the annular chamber 45. The controller 70 responds to the signals delivered by brake light 100 and pressure sensor 140 indicating this actuating condition and delivers a control signal to the control device 80. The control device 80 causes switch-over of the electric drive motors 10 to 40 into the braking mode, so that they can carry out deceleration of the wheels 1 to 4. Simultaneously, a second control signal of the controller 70 causes the valve 52 to switch over so that the connection 46 to 48 between the annular chamber 45 and the pressure fluid supply reservoir 65 is interrupted and the annular chamber 45 is hydraulically isolated.

Also, the electromagnet 9 is locked in its initial position by closing of the annular chamber 45 so that the actuating force is transmitted via the simulator spring 8 and the electromagnet 9 to the annular piston 44, and an increase in pressure takes place in the annular chamber 45 which is sensed by way of a pressure sensor 140. Once the pressure sensor 140 indicates that a greater braking effect is desired by the driver than is generated by the drive motors, the controller 70 will produce control signals which have as a result energization of the electromagnet 9. With this energization, the armature 13 of electromagnet 9, by way of the piston rod 15, causes displacement of the master cylinder piston 54 and thus pressure build-up in the hydraulic friction brakes 50, 60 connected to the master cylinder 11. In this braking mode, the connection 46 to 48 remains open in the event of power failure so that the pressure fluid volume enclosed in the annular chamber 45 is displaced into the pressure fluid supply reservoir 65 by shifting of the parts 6, 8, 9, 13, 44, and the hydraulic friction brakes 50, 60 are actuated by the displacement of the master cylinder piston 54.

Figure 4:
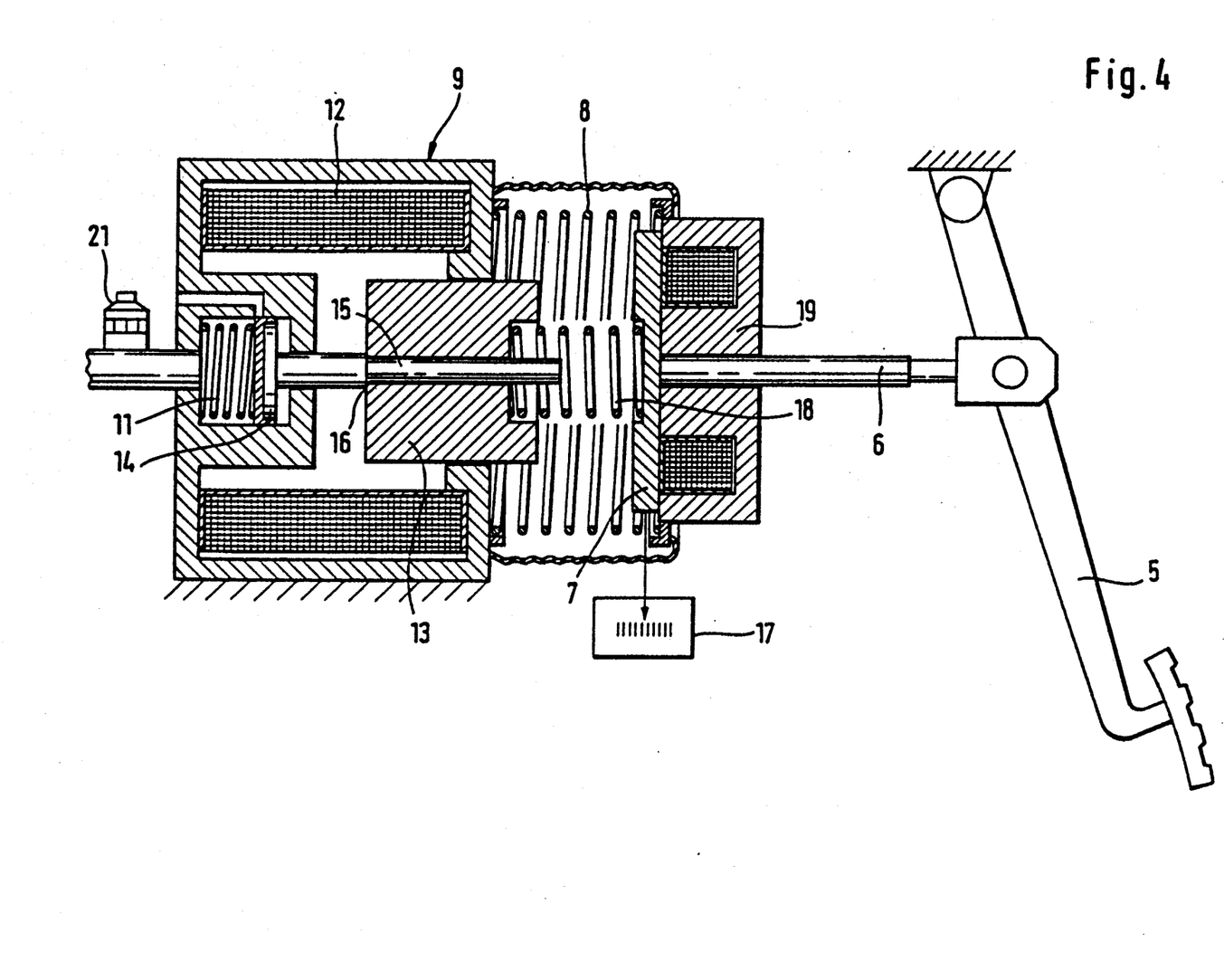
FIG. 4 is a partial cross-sectional view on an enlarged scale of a second embodiment of an actuating unit for the brake system shown in FIG. 1.

In the design variant of the actuating unit according to the present invention shown in FIG. 4, the actuating rod 6 articulated at the actuating pedal 5 carries a plate 7 which cooperates with a second electromagnet 19 which is adjacent to plate 7. The above-mentioned simulator spring 8 is clamped in between the housing of the first electromagnet 9 and the second electromagnet 19 which is arranged preferably coaxially relative to the actuating rod 6. The actuating travel of the actuating pedal 5 is determined by a travel sensor 17 sensing the movement of the plate 7. The safe abutment of the plate 7 on the second electromagnet 19 is ensured by the action of a second compression spring 18 which is supported on the armature 13 of the first electromagnet 9. Once the winding of the second electromagnet 19 is energized, e.g. by actuation of the controller 70 (FIG. 1) by the brake light switch 100, the plate 7 will be kept on the electromagnet 19 due to the electromagnetic attractive power of electromagnet 19 so that the force of the spring 8 must be overcome on actuation.

Preferably, the distance between the plate 7 and the end of the piston rod 15 displacing the master cylinder piston 14 is sized such that a mechanical transmission of the actuating force onto the piston rod 15 can take place in the event of power failure or an error detection. This mechanical transmission would occur when both the first electromagnet 9 and the second electromagnet 19 are not energized and the simulator spring 8 is uncoupled from the actuating pedal 5 in terms of effect. The pressure prevailing in the master brake cylinder 11 is sensed on actuation by a pressure sensor 21 connected thereto, while other possibilities of sensing the master cylinder can be realized as well, for instance by determining the magnetic field of the first electromagnet 9.

Figure 5:
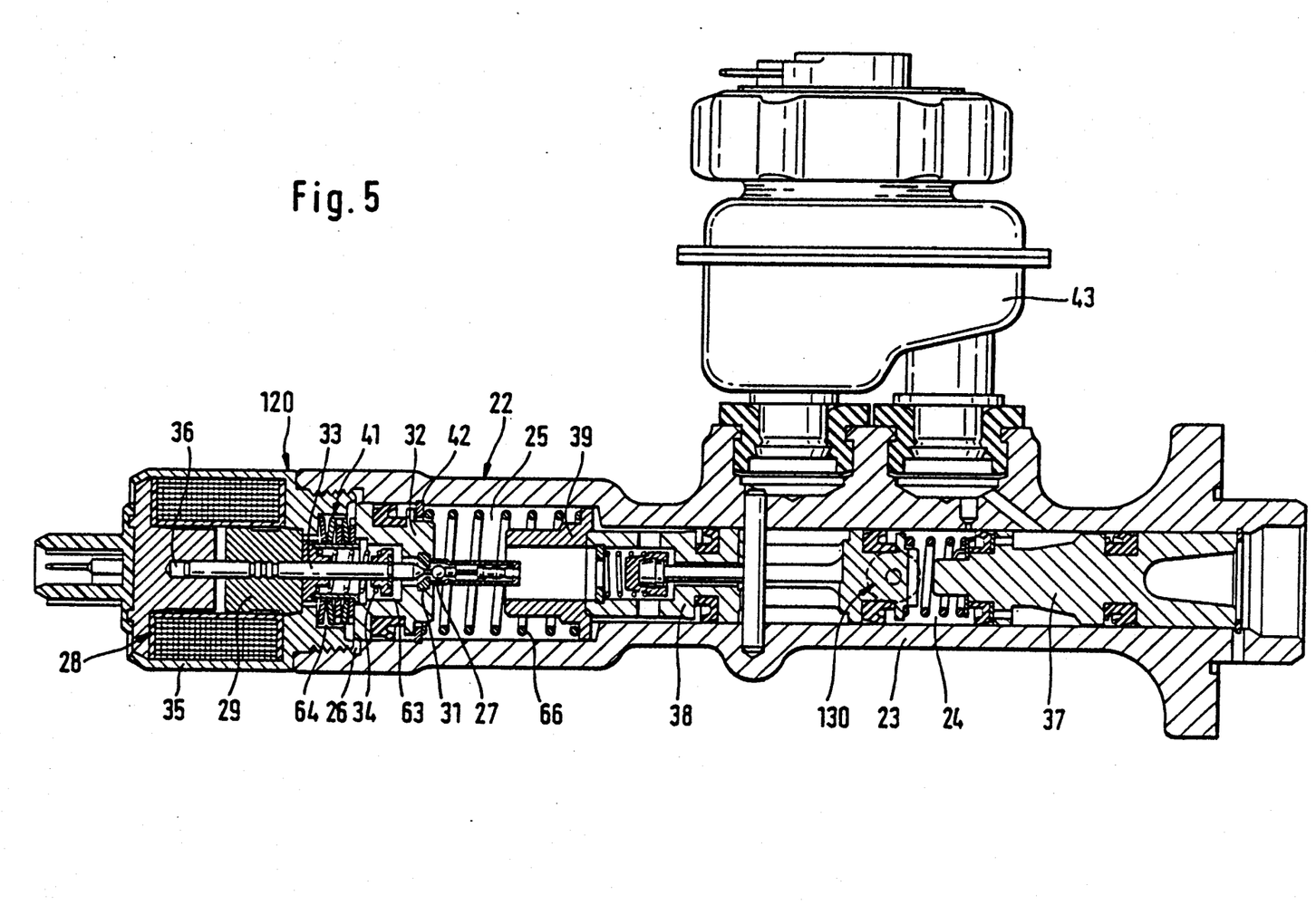
FIG. 5 is a cross-sectional view on an enlarged scale of the actuating unit of the brake system shown in FIG. 2.

The actuating unit shown in FIG. 5 is substantially composed of a master brake cylinder 22 having master cylinder housing 23. A valve assembly 120 is arranged in master cylinder housing 23. The master brake cylinder 22 includes two serially arranged master brake cylinder pistons 37, 38 that confine two pressure chambers 24, 25 which are in communication with an unpressurized pressure-fluid supply reservoir 43 via known valves. The pressure prevailing in the first pressure chamber 24 is sensed by the pressure sensor 130 (FIG. 2) which is indicated merely schematically. The second pressure chamber 25 is bounded by a hydraulic piston 32 which is axially slidable within limits and which, being in abutment on a stop 42 formed fast with the master cylinder housing, isolates the second pressure chamber 25 from another hydraulic chamber 26 to which the hydraulic friction brakes 50, 60 (FIG. 2) are connected.

The piston 32 which forms a component part of the previously mentioned valve assembly 120 is furnished with a stepped bore 63 and, at the end facing the second pressure chamber 25, a valve seat 31 which is closable by a closure member 27 formed by a ball that is resiliently biassed in the closing direction of the valve. Co-operating with the closure member 27 is a tappet 33 which is operable by an electromagnet 28. Tappet 33 is rigidly connected with the armature 29 of the electromagnet 28 and is biassed in the valve's opening direction by a spring 34 supported on the housing 35 of the electromagnet 28. The housing 35 of the electromagnet 28 includes in its rear portion a blind-end bore 36 whose length is dimensioned to be only slightly larger than the actuating stroke of the tappet 33 which can get into abutment on the bottom of the blind-end bore 36 in the event of a possible detachment of its force-transmitting connection with the armature 29. The housing 35 of the electromagnet 28 serves as an axial stop for the piston 32, bounds the hydraulic chamber 26 and accommodates in a cylindrical recess 64a a cup spring assembly 41 on which the piston 32 abuts forcelessly in the inactive position.

It is particularly favorable that the valve assembly 120, as shown in the drawing, is rotationally symmetrical and closes the bore in the master cylinder housing 23 such that its axis of symmetry is identical with that of the master cylinder 22. Namely, on failure of the second pressure chamber 25, a like arrangement permits the transmission of mechanical forces from the second master cylinder piston 38 to the piston 32 so that an exploitable pedal travel proportional to the pedal force does not get lost in the second pressure chamber 25; instead, the force resulting from this pedal travel is propagated to hydraulic chamber 26. The transmission of force preferably takes place by a cylindrical sleeve 39 which is axially abutting on the second master cylinder piston 38 and on which a piston return spring 66 takes support which biases the second master cylinder piston 38.

The following description of the operation of the inventive brake system shown in FIGS. 2 and 5 is based on an inactive condition which is illustrated in the drawing. In the inactive condition the two pressure chambers 24 and 25 as well as the hydraulic chamber 26 are unpressurized. The pressure chambers 24 and 25 are in communication with the pressure fluid supply reservoir 43, and the chamber 26 is in communication with the second pressure chamber 25 via the open valve 31, 27.

When a braking operation is initiated by actuating the actuating pedal 5, a signal generated by the brake light switch 100 causes energization of the electromagnet 28 of the valve assembly 120. With this energization, armature 29 draws the tappet 33 to the left in the drawing so that the ball 27 moves into abutment on the sealing seat 31. Thus, the connection between the second pressure chamber 25 and the chamber 26 or the hydraulic friction brakes 50, 60, respectively, is interrupted. A further pressure increase in the pressure chambers 24 and 25 has as a result that the pressure sensor 130 connected to the first pressure chamber 24 produces an output signal which is supplied to the controller 70. The control signal of the controller 70 delivered to the control device 80 causes switch-over of the electric drive motors 10, 20, 30, 40 into the braking mode during which braking of the vehicle is effected. The pressure development in the second pressure chamber 25 causes the piston 32 to displace in opposition to the cup spring assembly 41 and thereby generates a pedal travel which is proportional to the achieved braking effect. The movement of the piston 32 causes merely a pressure fluid volume to displace out of the chamber 26, from which ensues the application of the linings of the hydraulic friction brakes 50, 60 to the wheels 1, 2.

Once the pressure prevailing in the second pressure chamber 25 exceeds a predetermined value, for instance 40 bar, the piston 32 reaches the tappet 33 positioned by the electromagnet 28. At this point, the ball 27 is pushed open, and the connection between the second pressure chamber 25 and the chamber 26 is opened. As a result, the pressure prevailing in the chamber 26 is increased which, on the one hand, operates the hydraulic brakes 50, 60 and, on the other hand, in coaction with the cup spring assembly 41, returns the piston 32 until the control valve 31, 27 has closed again. Upon power failure, the spring force of the compression spring 34 in any position causes the sealing seat 31 to open and thus establishes a connection between the second pressure chamber 25 and the hydraulic chamber 26.

What is claimed:

1. A brake system for automotive vehicles having electric drive comprising:
   an actuating pedal;
   an actuating rod coupled to said actuating pedal and movable in response to said actuating pedal;
   a plurality of vehicle wheels;
   at least one electric drive motor for driving and braking said plurality of vehicle wheels;
   a master brake cylinder defined by a master brake cylinder housing forming a first pressure chamber, a second pressure chamber and a third pressure chamber;
   a plurality of hydraulic friction brakes in pressure fluid communication with said third pressure chamber and individually associated with said plurality of vehicle wheels for braking said plurality of vehicle wheels;
   a pressure sensor in said first pressure chamber for determining a pressure prevailing in said first pressure chamber and for sensing the actuating force of said actuating pedal;
   a position sensor for determining the actuating position of said actuating pedal and for generating actuating pedal position signals;
   an electronic controller responsive to said actuating pedal position signals for generating control signals;
   a control device responsive to said control signals and to said pressure sensor for controlling said at least one electric drive motor; and
   a valve, operable as an electromagnetically actuated bypass valve responsive to said actuating pedal position signals and operable as a differential-pressure valve, arranged on said master brake cylinder housing between said second pressure chamber and said third pressure chamber.

2. A brake system as claimed in claim 1, further comprising:
   a piston which is slidable within limits relative to said master brake cylinder housing and to which the hydraulic pressure prevailing in the second pressure chamber is applied, wherein said valve is formed by a sealing seat provided in said piston;
   a closing member for closing said sealing seat of said valve; and
   an electromagnetically slidable tappet for driving said closing member off of said sealing seat.

3. A brake system as claimed in claim 2, wherein said valve is rotationally symmetrical and is arranged at the end of said master cylinder housing such that its axis of symmetry is identical with the longitudinal axis of said master cylinder.

4. A brake system as claimed in claim 2, further comprising a compression spring for preloading said tappet in the opening direction of said valve.

5. A brake system as claimed in claim 1, wherein said valve is rotationally symmetrical and is arranged at the end of said master cylinder housing such that its axis of symmetry forms an angle from 0° to 90° with the longitudinal axis of said master cylinder.

6. A brake system as claimed in claim 1, wherein said electronic controller is fitted to said master brake cylinder housing.

7. A brake system for automotive vehicles having electric drive comprising:
   an actuating pedal;
   an actuating rod coupled to said actuating pedal and movable in response to said actuating pedal;
   a plurality of vehicle wheels;
   at least one electric drive motor for driving and braking said plurality of vehicle wheels;
   a master brake cylinder defined by a master brake cylinder housing forming a first pressure chamber, a second pressure chamber and a third pressure chamber;
   a plurality of hydraulic friction brakes in pressure fluid communication with said third pressure chamber and individually associated with said plurality of vehicle wheels for braking said plurality of vehicle wheels;
   a pressure sensor in said first pressure chamber for determining a pressure prevailing in said first pressure chamber and for sensing the actuating force of said actuating pedal;
   a position sensor for determining the actuating position of said actuating pedal and for generating actuating pedal position signals;
   an electronic controller responsive to said actuating pedal position signals for generating control signals;
   a control device responsive to said control signals and to said pressure sensor for controlling said at least one electric drive motor;
   a piston which is slidable within limits relative to said master brake cylinder housing and to which the hydraulic pressure prevailing in the second pressure chamber is applied, and having a sealing seat provided in said piston;
   a valve, formed by said sealing seat provided in said piston, operable as an electromagnetically actuated bypass valve responsive to said actuating pedal position signals and operable as a differential-pressure valve, and arranged on said master brake cylinder housing between said second pressure chamber and said third pressure chamber;
   a closing member for closing said sealing seat of said valve;
   an electromagnetically slidable tappet for driving said closing member off of said sealing seat;
   an armature coupled to said tappet;

an electromagnet surrounding said armature for actuating said armature and energized by said actuating pedal position signals; and a housing for said electromagnet in which is formed a blind-end bore in which is guided said tappet and having a length slightly larger than the actuating stroke of the tappet.

8. A brake system as claimed in claim 7, wherein said electromagnet is a switching magnet.

9. A brake system as claimed in claim 7, wherein said electromagnet is a proportional magnet.

10. A brake system as claimed in claim 9, further comprising a master cylinder piston confining said second pressure chamber which is movable with said piston.

11. A brake system as claimed in claim 10, further comprising a cylindrical sleeve in axial abutment on said master cylinder piston for transmitting the force between said master cylinder piston and said piston.

12. A brake system as claimed in claim 11, wherein said piston abuts on a cup spring assembly supported on said housing of said electromagnet and on a stop formed with said master cylinder housing.

13. A brake system as claimed in claim 12, wherein said housing of said electromagnet serves as an axial stop for said piston.

14. A brake system as claimed in claim 13, wherein said pressure sensor responds exclusively to the pressure prevailing in said first pressure chamber.

* * * * *

UNITED STATES PATENT AND TRADEMARK OFFICE
CERTIFICATE OF CORRECTION

PATENT NO.   : 5,421,643
DATED        : June 6, 1995
INVENTOR(S)  : Kircher et al.

It is certified that error appears in the above-indentified patent and that said Letters Patent is hereby corrected as shown below:

On the title page, item [75], the third inventor should be changed from "Bill Karlheinz" to --Karlheinz Bill--.

Signed and Sealed this

Twentieth Day of February, 1996

Attest:

BRUCE LEHMAN

*Attesting Officer*    *Commissioner of Patents and Trademarks*